United States Patent Office 3,273,443
Patented Sept. 20, 1966

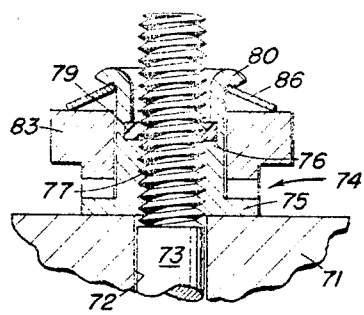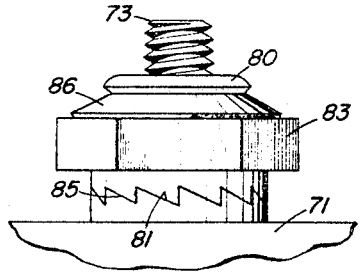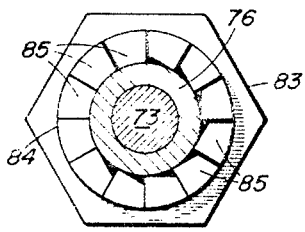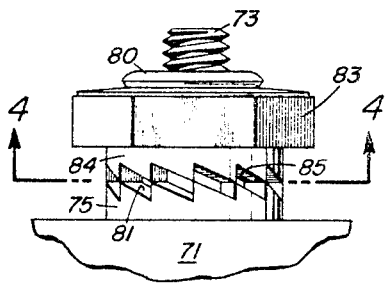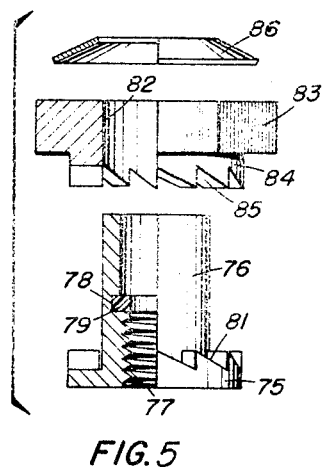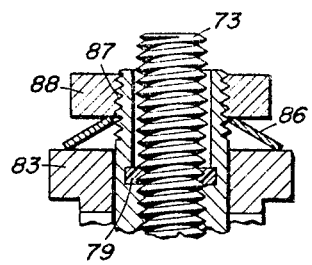

3,273,443
TORQUE LIMITING NUT
Norman N. Rubin, 10012 Portland Place,
Silver Spring, Md.
Filed Feb. 28, 1964, Ser. No. 348,917
1 Claim. (Cl. 85—61)

The invention described herein may be manufactured and used by or for the Government of the United States of America for governmental purposes without the payment of any royalties thereon or therefor.

This invention relates to separable fasteners of the bolt and nut type, and, more particularly, to a nut designed to have relative linear motion, with a bolt, effected by rotary motion ineffective to produce relative linear motion upon a predetermined resistance to torque being established.

There are instances where a nut and bolt are used where overtightening of the nut is detrimental to the job to which the separable fastener is applied. An extra turn can weaken the threads and sometimes the entire strain of the fastening is on a single thread which when subjected to an overstrain can rupture and render the fastener useless. There are instances where, due to the nature of the material, such as glass or ceramic material of a fragile nature, the nut should not be tightened after a predetermined resistance is reached. Any further torque will rupture the material and any lesser torque will not insure a complete fastening. While it is true there are wrenches where the torque is measured any force beyond this measurement results in a non-turning of the nut. However, it is believed that this does not solve the problem as it is notorious that although tools are made to do a particular job, the mechanic will use the tool at hand and the advantages of designing a tool for a particular purpose is wasted. With the design of a nut which could not be tightened beyond a desired resistance to turning the hazard of overtightening could be avoided.

It is an object of the present invention to provide a separable fastener of the nut and bolt type which has relative linear movement between the nut and the bolt upon the application of rotary motion to the nut, which upon a predetermined resistance to turning being reached, further torque applied to the nut will be ineffective to produce further relative linear motion between the nut and bolt.

It is another object of the present invention to provide a separable fastener such as a nut and bolt where the nut is designed so that it may not be overtightened, and that upon a predetermined resistance to turning being reached, any further torque applied will be ineffective to produce any linear movement of the nut relative to the bolt.

It is another object of the present invention to provide a structure which is built into the fastener itself which prevents overtightening.

It is another object of the present invention to provide friction drive means within the body structure of the nut which upon reaching a predetermined load will slip permitting continued turning of the nut without advancement of the nut on the bolt.

It is a further object of the present invention to provide a nut having two separable portions, one of the portions engaging the threads of the bolt and the other of said portions being engaged by a wrench and turning the first portion through some disengageable drive.

It is a further object of the present invention to provide means within the body structure of the nut to permit rotation of the nut without linear movement of the nut relative to the bolt.

It is a further object of the present invention to provide a separable fastener having a bolt and a nut with the nut being of two parts, one of the parts engaging the threads of the bolt and the other of said parts being used to turn the bolt engaging nut with a disengaging drive means between the two sections of the nut so that when a predetermined resistance to turning is reached one of the sections of the nut may be rotated without imparting rotation to the other section.

Other objects, advantages and novel features of the invention will become apparent from the following detailed description of the invention when considered in conjunction with the accompanying drawings wherein:

FIG. 1 is a vertical sectional view of a separable fastener;

FIG. 2 is a front elevation of the fastener shown in FIG. 1;

FIG. 3 is a vew similar to FIG. 2 showing a different position of the nut in relation to the rotary member;

FIG. 4 is a bottom plan view taken on line 4—4 of FIG. 3;

FIG. 5 is an exploded view showing the parts of the fastener separated;

FIG. 6 is a vertical cross-sectional view of a modified form of the fastener shown in FIG. 1.

Referring to the drawing, a separable fastener is illustrated of the nut and bolt type with provisions made integral with the nut for preventing overtightening.

A structure 71 to which the fastener is applied has a hole 72 through which the bolt 73 passes. The nut 74 has a base 75 and an elongated, substantially cylindrical portion 76 which is bored and interiorly threaded as at 77 and formed with an interior annular recess 78 in which a washer 79 is seated. Outward of the washer, the nut is not threaded and terminates in a rolled collar 80 hereinafter described. The base 75 has on its outer face a ring of ratchet teeth 81 all of which extend beyond the cylindrical portion 76. Ratchet tooth may be defined as having one side which is radial and the other inclined.

The outer surface of the cylindrical portion serves as a bearing for a rotary member 82 which is formed with a hexagon head 83 and a depending cylindrical portion 84 formed on its end with ratchet teeth 85 adapted to engage and cooperate with the teeth 81.

A spring washer 86 of the Belleville type having its inner edge engaged with the overturned edge of the body portion 76 and with its outer edge bearing on the upper face of the rotary member controls the pressure exerted by the teeth 85 on the teeth 81.

FIG. 6 shows a modification of this type of separable fastener in that the cylindrical body portion is threaded exteriorly at 87 to receive a nut 88. The nut 88 replaces the overturned edge 80 and engages the inner edge of the spring washer 86. This permits the force exerted between the teeth faces to be varied by making the nut 88 more or less tight.

In use, the type of separable fastener shown in FIGS. 1–6 may secure glass or frangible ceramic objects in place without overtightening the nut and thereby crushing the objects to be held by the fastener. The rotary member is turned in the direction shown in FIG. 4, the force on the teeth 85 against the teeth 81 turning the nut onto the bolt. When the resistance to turning becomes great enough to compress the spring washer 86, FIG. 3, by causing the teeth 85 to ride over the teeth 81, the rotary member will turn without imparting motion to the nut 74. It will thus be seen that the nut may not be overtightened and that the application of a torque over a predetermined amount will only result in the turning of the rotary member and will not cause relative linear motion between the nut and the bolt.

Obviously many modifications and variations of the present invention are possible in the light of the above teachings. It is therefore to be understood that within the scope of the appended claim the invention may be practiced otherwise than as specifically described.

What is claimed is:

A separable fastener, comprising:
- a threaded bolt;
- a nut having a base portion and a substantially cylindrical body portion, said base portion being formed with integral ratchet teeth, of the type having one face radial and the other face inclined, said teeth being adapted to be driven, said body portion having a bore increased in diameter adjacent its outer end and being threaded for at least half of the length of the bore adjacent the inner end;
- a rotary member journaled on the cylindrical body portion for free rotation with relation to said nut, said rotary member being formed with driving ratchet teeth of the type substantially identical with the base portion teeth, said ratchet teeth of the rotary member being adapted to engage the ratchet teeth of the base portion of the nut to provide a drive, in a clockwise direction, capable of slipping and a positive drive in a counter clockwise direction;
- a resilient conical washer having its outer periphery engaging said rotary member to maintain said rotary member driving teeth in driving engagement with the ratchet teeth of the base portion of the nut;
- said rotary member and said washer being retained on the cylindrical body portion by a radially outwardly extending collar at the outer end of said cylindrical body portion;
- whereby upon resistance to turning of said nut exceeding a predetermined amount, said resilient washer will release said driving teeth from operable engagement with the teeth of the base portion of the nut.

References Cited by the Examiner

UNITED STATES PATENTS

| | | | |
|---|---|---|---|
| 1,395,592 | 11/1921 | Odom | 64—29 |
| 2,164,485 | 7/1939 | Vantis | 64—28 |
| 2,410,971 | 11/1946 | Hartley | 64—29 |
| 2,450,694 | 10/1948 | Sauer | 151—7 |
| 2,524,481 | 10/1950 | Schermulz et al. | 85—33 |
| 2,685,812 | 8/1954 | Dmitroff | 85—61 |
| 2,744,396 | 5/1956 | Nazy et al. | 64—28 |

FOREIGN PATENTS

| | | |
|---|---|---|
| 108,532 | 8/1917 | Great Britain. |
| 31,207 | 2/1904 | Switzerland. |

CARL W. TOMLIN, *Primary Examiner.*

EDWARD C. ALLEN, *Examiner.*

R. S. BRITTS, *Assistant Examiner.*